(12) United States Patent
Zhang et al.

(10) Patent No.: US 10,353,211 B1
(45) Date of Patent: Jul. 16, 2019

(54) PATTERN PROJECTOR

(71) Applicant: Gemmy Industries Corporation, Coppell, TX (US)

(72) Inventors: Cheng Chun Zhang, Shenzhen (CN); Lio Yenwei Chang, Coppell, TX (US)

(73) Assignee: Gemmy Industries Corporation, Coppell, TX (US)

( * ) Notice: Subject to any disclaimer, the term of this patent is extended or adjusted under 35 U.S.C. 154(b) by 0 days.

(21) Appl. No.: 15/911,688

(22) Filed: Mar. 5, 2018

(51) Int. Cl.
*G03B 21/14* (2006.01)
*G02B 27/20* (2006.01)
*G02B 27/09* (2006.01)

(52) U.S. Cl.
CPC ......... *G02B 27/20* (2013.01); *G02B 27/0955* (2013.01); *G03B 21/145* (2013.01)

(58) Field of Classification Search
CPC ..... G02B 27/20; G02B 27/0955; G03B 21/14
USPC ........................................................ 353/42
See application file for complete search history.

(56) References Cited

U.S. PATENT DOCUMENTS

| | | | |
|---|---|---|---|
| 10,077,889 B1* | 9/2018 | Qin | F21V 14/06 |
| 2015/0131288 A1* | 5/2015 | Zhang | F21V 14/06 362/277 |
| 2015/0159842 A1* | 6/2015 | Zhang | F21V 21/30 362/231 |
| 2016/0026073 A1* | 1/2016 | Zhang | G03B 21/142 353/101 |
| 2016/0349603 A1* | 12/2016 | Chang | G03B 21/10 |

* cited by examiner

*Primary Examiner* — Steven Whitesell Gordon
*Assistant Examiner* — Jerry L Brooks
(74) *Attorney, Agent, or Firm* — C. G. Mersereau; DeWitt LLP

(57) ABSTRACT

A pattern projector has a housing and a projection device disposed in the housing. The housing has a base and a cover. The cover is disposed on the base and has a connecting portion connected to the base, a convex portion, and a datum plane. The convex portion protrudes out of a front surface of the connecting portion, and has an outer lens disposed on the convex portion. The datum plane is defined between the connecting portion and the convex portion. A maximum height is defined from an inner surface of the convex portion to the datum plane. A maximum inner diameter of the convex portion is defined on the datum plane. The maximum inner diameter is three times to eleven times as long as the maximum height. A pattern projected by the projection device will not be distorted.

20 Claims, 5 Drawing Sheets

PATTERN PROJECTOR

BACKGROUND OF THE INVENTION

1. Field of the Invention

The present invention relates to a pattern projector, and more particularly a pattern projector that can project a clear pattern by an outer lens of the pattern projector.

2. Description of Related Art

A conventional pattern projector can project patterns in lighting variations either indoors or outdoors. The conventional pattern projector has a housing, a driver, a multi-surface lens, at least one lighting member, and a hemispherical cover. The driver, the multi-surface lens, and the at least one lighting member are disposed in the housing. The multi-surface lens is connected to and is controlled by the driver. The hemispherical cover is disposed on a front surface of the housing and has a sphere center. An edge of the hemispherical cover faces the housing, is enclosed to form a circle, and has a circle center coinciding with the sphere center of the hemispherical cover. A diameter of the circle is twice a distance between a fully-advanced end of the hemispherical cover and the circle center.

The hemispherical cover has a pattern portion disposed on a front surface of the hemispherical cover. The multi-surface lens is driven by the driver to rotate relative to the driver. Light emitted by the lighting member passes through the multi-surface lens to form a dynamic light. The dynamic light passes through the pattern portion of the hemispherical cover for projecting a pattern. In the projection process, the contour of the pattern is maintained unchanged. The dynamic light generated by the multi-surface lens is varied simultaneously to form dynamic lighting variations for increasing the entertaining effect.

However, the front surface of the hemispherical cover is a hemispherical surface. The pattern portion is disposed on the front surface of the hemispherical cover. The pattern projected by the conventional pattern projector would be distorted severely. Therefore, a viewer is uncomfortable in watching the distorted pattern. The conventional pattern projector cannot project a pattern including characters without distortion. Pattern types that the conventional pattern projector is capable of projecting are limited.

To overcome the shortcomings, the present invention tends to provide a pattern projector to mitigate or obviate the aforementioned problems.

SUMMARY OF THE INVENTION

The main objective of the invention is to provide a pattern projector that may solve the problems that the front surface of the hemispherical cover is a hemispherical surface, and the pattern projected out of the hemispherical surface is distorted.

The pattern projector has a housing and a projection device. The housing has a base, a power box, and a cover. The base has a front surface, a chamber, and an opening. The chamber is formed in the base. The opening is formed on the front surface of the base and communicates with the chamber. The power box is disposed in the base and is located in the chamber of the base. The cover is disposed on the front surface of the base, covers the opening of the base, and has a connecting portion, a convex portion, and a datum plane. The connecting portion is connected to the base and has a front surface. The convex portion is formed on and protrudes out of the front surface of the connecting portion, and has a rear surface facing the opening of the base and an outer lens disposed on the convex portion. The datum plane is defined between the connecting portion and the convex portion.

A maximum height is defined from the inner surface of the convex portion to the datum plane. A maximum inner diameter of the convex portion is defined on the datum plane. The maximum inner diameter is three times to eleven times as long as the maximum height. The projection device is disposed in the chamber of the base and has at least one lighting member. The at least one lighting member is disposed in the base and is electrically connected to the power box.

The base has a rear surface and a wire hole. The wire hole is formed on the rear surface of the base and communicates with the chamber. The outer lens has multiple protrusions disposed on the convex portion for forming a pattern.

The convex portion has a front surface. The outer lens is disposed on the front surface or the rear surface of the convex portion. The protrusions are dots, blocks, or strips. The protrusions are formed on or mounted on the convex portion.

The base has a waterproof element and a wire clip. The waterproof element is disposed on the front surface of the base, surrounds the opening, and has a waterproof wall and an engaging portion. The waterproof wall is detachably disposed on the front surface of the base and has a front surface. The engaging portion is formed on the front surface of the waterproof wall and engages with the connecting portion of the cover. The wire clip is disposed in the base, is located in the chamber of the base, and surrounds the wire hole. The cover has a front surface and an opaque layer disposed on the front surface of the cover and is disposed adjacent to the outer lens.

From the above description, the projection device has a driver, a driving shaft, and an inner lens. The driver is detachably disposed in the housing, is located in the chamber of the base, and is electrically connected to the power box. The driving shaft is rotatably disposed on the driver. The inner lens is disposed on the driving shaft and has multiple corrugated stripes formed on the inner lens. The at least one lighting member is located between the driver and the inner lens.

The pattern projector has a supporting device. The supporting device is disposed below the base and has a frame and a grounding stick. The frame is rotatably disposed below the housing. The grounding stick is rotatably disposed below the frame.

One of the at least one lighting member has a seat and at least one lighting element. The seat is disposed in the base and has a side surface facing the cover. The at least one lighting element is disposed on the side surface of the seat and is a light-emitting diode.

Light emitted by the at least one lighting member passes through the inner lens rotated by the driver to form a dynamic light. The dynamic light passes through the cover having the outer lens. The convex portion protrudes out of the front surface of the connecting portion. The patterns of the outer lens projected by the pattern projector cannot be distorted and overlapped. The contour of the patterns is clear in lighting variations. The entertaining effect of the pattern is increased. The pattern is clear for the viewer to watch comfortably. In addition, the cover can be detached from the housing for replacing another cover having a different outer lens to project a different pattern. Furthermore, the driver, the driving shaft, and the inner lens can be detached from the base. Light emitted by the at least one lighting member directly passes through the cover for projecting the pattern of the outer lens to form a static pattern.

Other objects, advantages and novel features of the invention will become more apparent from the following detailed description when taken in conjunction with the accompanying drawings.

DETAILED DESCRIPTION OF PREFERRED EMBODIMENT

Figure 1:
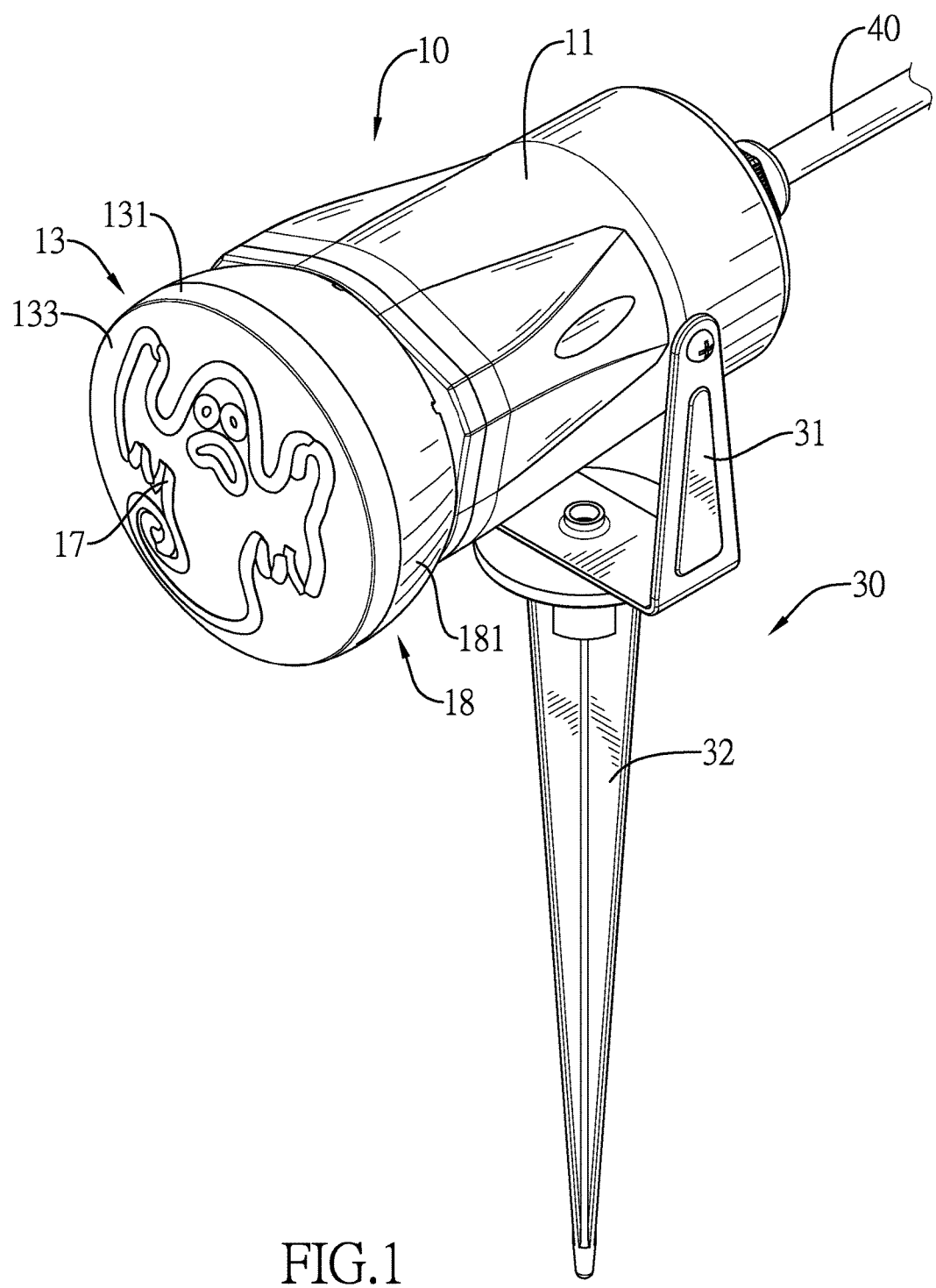
FIG. 1 is a perspective view of a pattern projector in accordance with the present invention.
Figure 2:
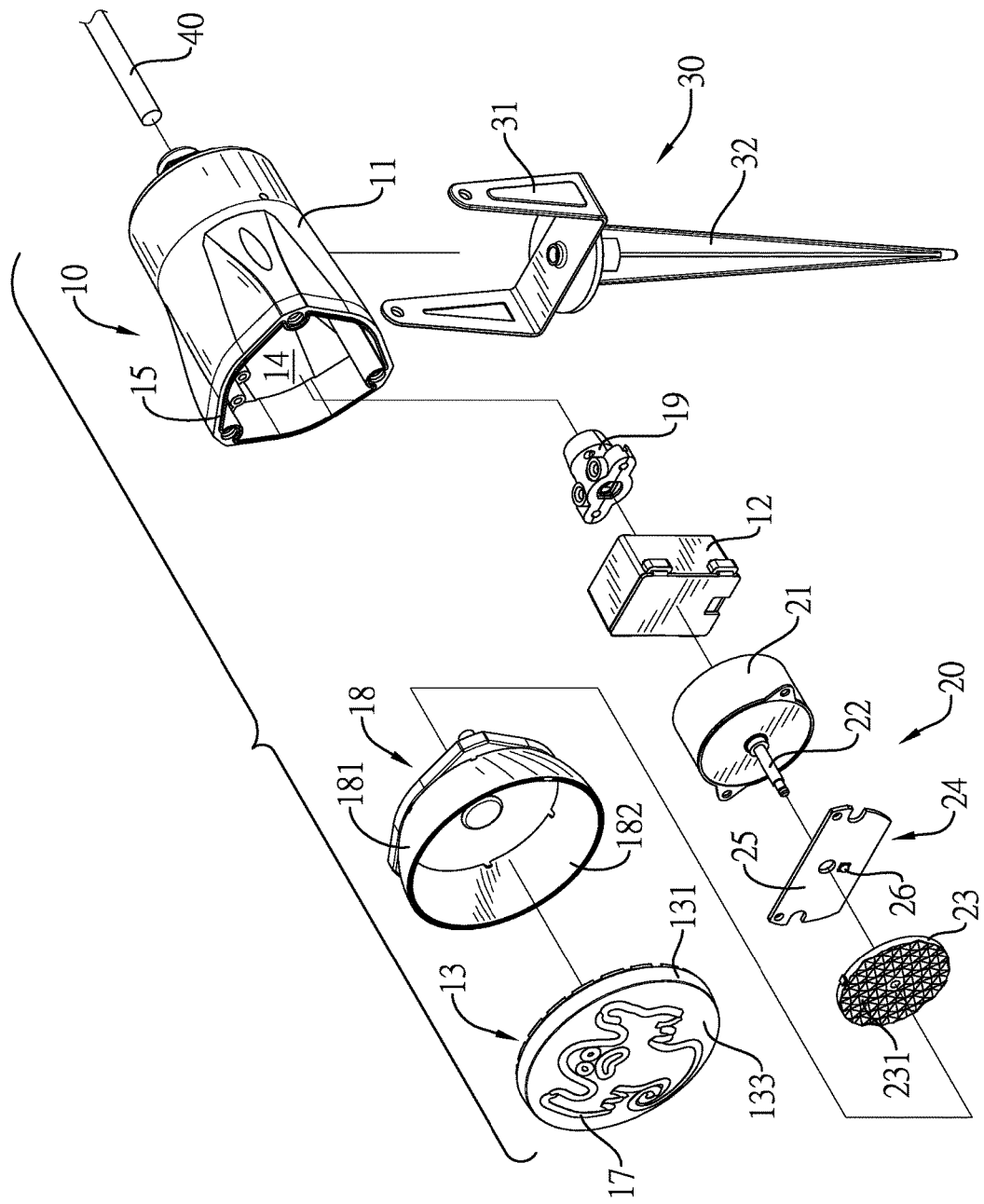
FIG. 2 is an exploded perspective view of the pattern projector in FIG. 1.
Figure 3:
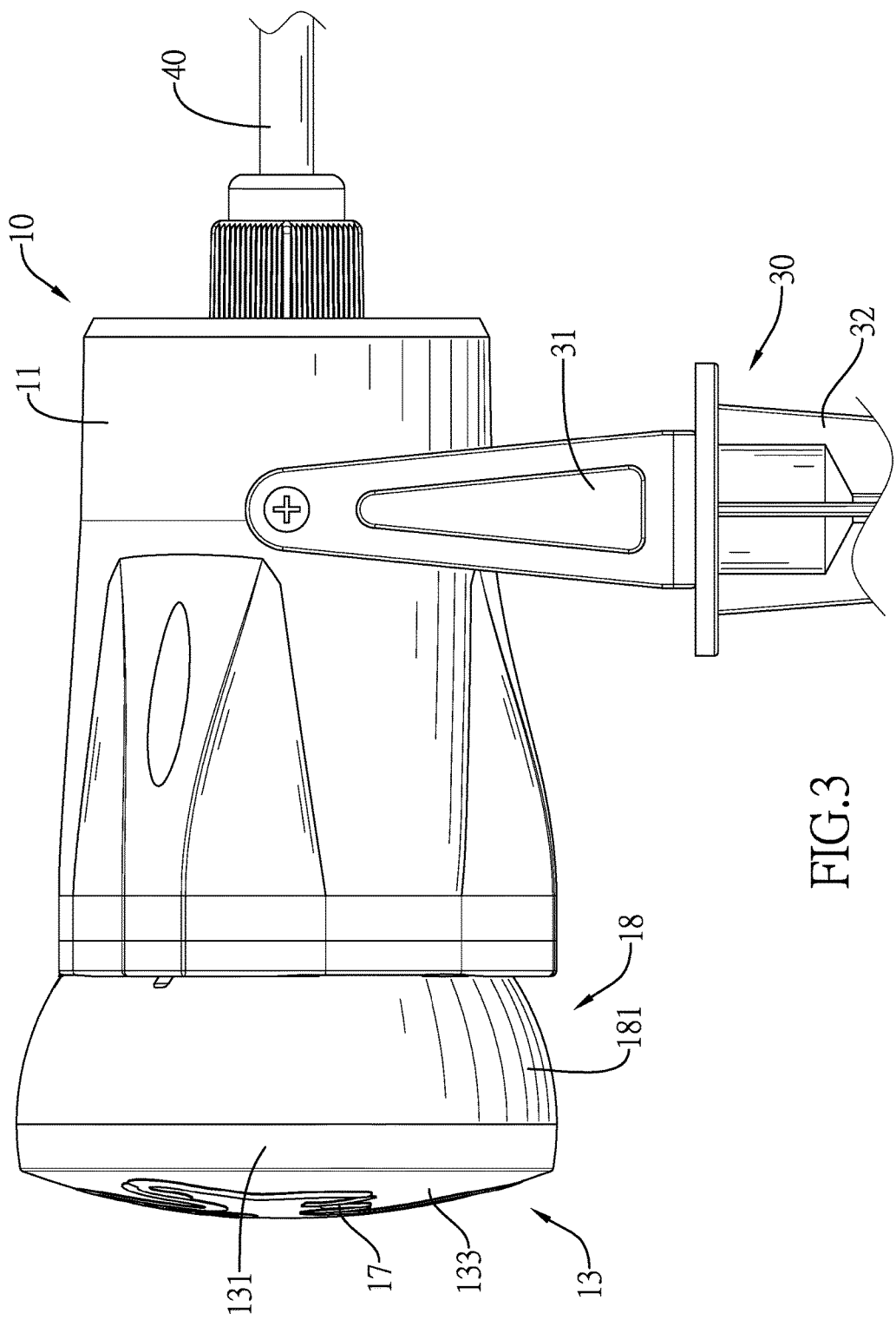
FIG. 3 is an enlarged side view of the pattern projector in FIG. 1.

With reference to FIGS. 1 to 3, a pattern projector in accordance with the present invention comprises a housing 10, a projection device 20, and a supporting device 30.

Figure 4:
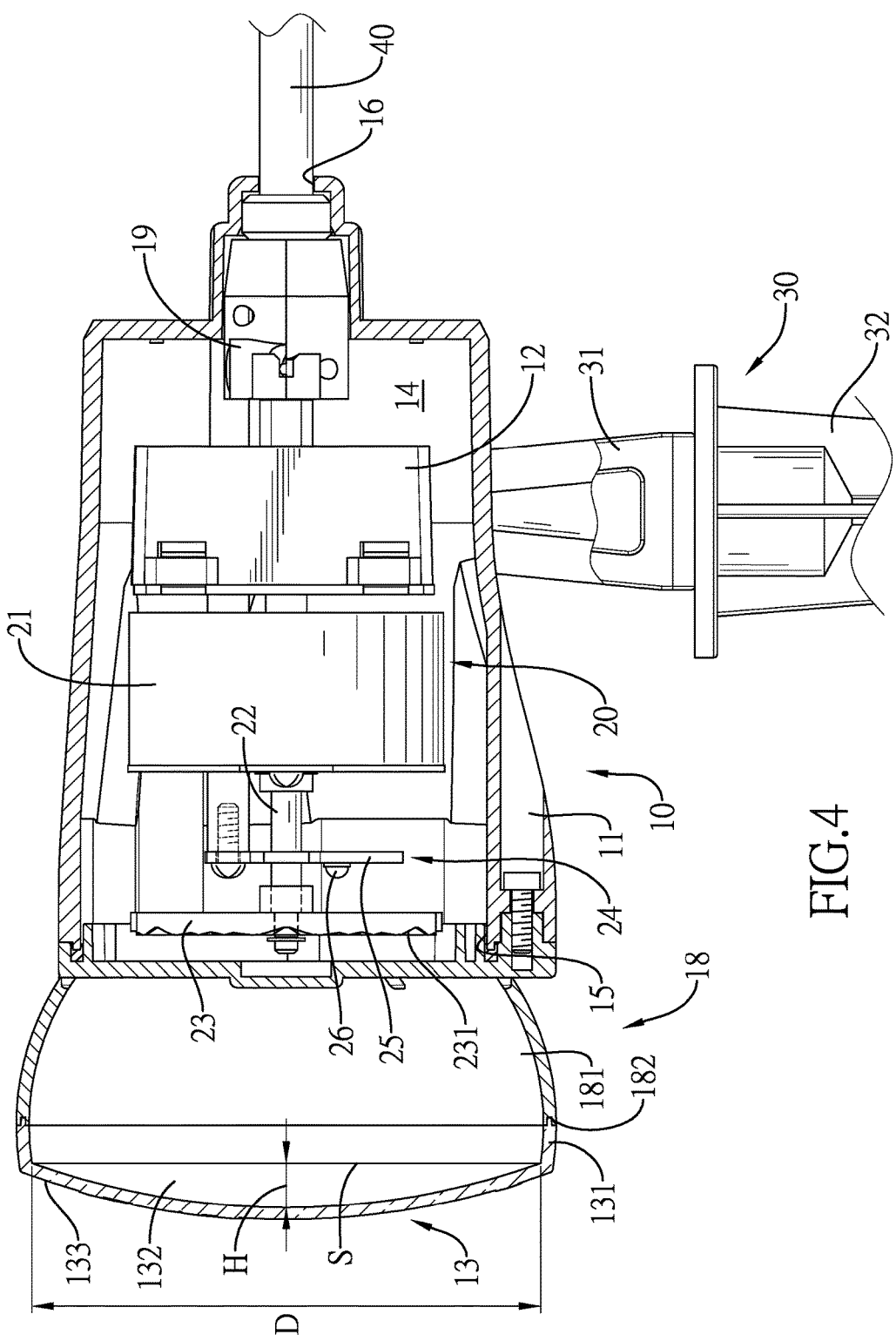
FIG. 4 is an enlarged side view in partial section of the pattern projector in FIG. 1.

With reference to FIGS. 1, 2, and 4, the housing 10 has a base 11, a power box 12, and a cover 13. The base 11 has a front surface, a chamber 14, and an opening 15. The chamber 14 is formed in the base 11. The opening 15 is formed on the front surface of the base 11 and communicates with the chamber 14 of the base 11. The power box 12 is disposed in the base 11 and is located in the chamber 14 of the base 11. The cover 13 is disposed on the front surface of the base 11, covers the opening 15 of the base 11, and has a connecting portion 131, a convex portion 132, and a datum plane S. The connecting portion 131 is connected to the base 11 and has a front surface. The convex portion 132 is formed on and protrudes out of the front surface of the connecting portion 131.

The convex portion 132 has a rear surface and an outer lens 17. The rear surface of the convex portion 132 faces the opening 15 of the base 11. The outer lens 17 is disposed on the convex portion 132. The datum plane S is defined between the connecting portion 131 and the convex portion 132. A maximum height H is defined from an inner surface of the convex portion 132 to the datum plane S. A maximum inner diameter D of the convex portion 132 is defined on the datum plane S. The maximum inner diameter D is three times to eleven times as long as the maximum height H. The convex portion 132 has a front surface. The outer lens 17 is disposed on the front surface or the rear surface of the convex portion 132.

The base 11 has a rear surface and a wire hole 16. The wire hole 16 is formed on the rear surface of the base 11 and communicates with the chamber 14. The outer lens 17 has multiple protrusions. The protrusions of the outer lens 17 are disposed on the convex portion 132 for forming a pattern. The protrusions of the outer lens 17 may provide a spotlight effect. The protrusions of the outer lens 17 are dots, blocks, or strips. The protrusions are formed on or mounted on the convex portion 132.

The base 11 has a waterproof element 18 and a wire clip 19. The waterproof element 18 is disposed on the front surface of the base 11, surrounds the opening 15, and has a waterproof wall 181 and an engaging portion 182. The waterproof wall 181 is detachably disposed on the front surface of the base 11 and has a front surface. The engaging portion 182 is formed on the front surface of the waterproof wall 181 and engages with the connecting portion 131 of the cover 13. The wire clip 19 is disposed in the base 11, is located in the chamber 14, and surrounds the wire hole 16. The cover 13 has a front surface and an opaque layer 133 disposed on the front surface of the cover 13 and is disposed adjacent to the outer lens 17.

The projection device 20 is disposed in the housing 10, is located in the chamber 14 of the base 11, and has a driver 21, a driving shaft 22, an inner lens 23, and at least one lighting member 24. The driver 21 is disposed in the base 11, is located in the chamber 14 of the base 11, and is electrically connected to the power box 12. The driving shaft 22 is rotatably disposed on the driver 21. The inner lens 23 is disposed on the driving shaft 22. The at least one lighting member 24 is disposed in the base 11 of the housing 10, is located between the driver 21 and the inner lens 23, and is electrically connected to the power box 12.

Furthermore, the driver 21 is detachably disposed in the housing 10. Each one of the at least one lighting member 24 has a seat 25 and at least one lighting element 26. The seat 25 is disposed in the base 11 of the housing 10 and has a side surface facing the cover 13. The at least one lighting element 26 is disposed on the side surface of the seat 25 and is a light-emitting diode. The inner lens 23 has multiple corrugated stripes 231. The corrugated stripes 231 are formed on the inner lens 23.

With reference to FIGS. 1 and 2, the supporting device 30 of the pattern projector is disposed below the base 11 and has a frame 31 and a grounding stick 32. The frame 31 is rotatably disposed below the housing 10. The grounding stick 32 is rotatably disposed below the frame 31.

Figure 5:
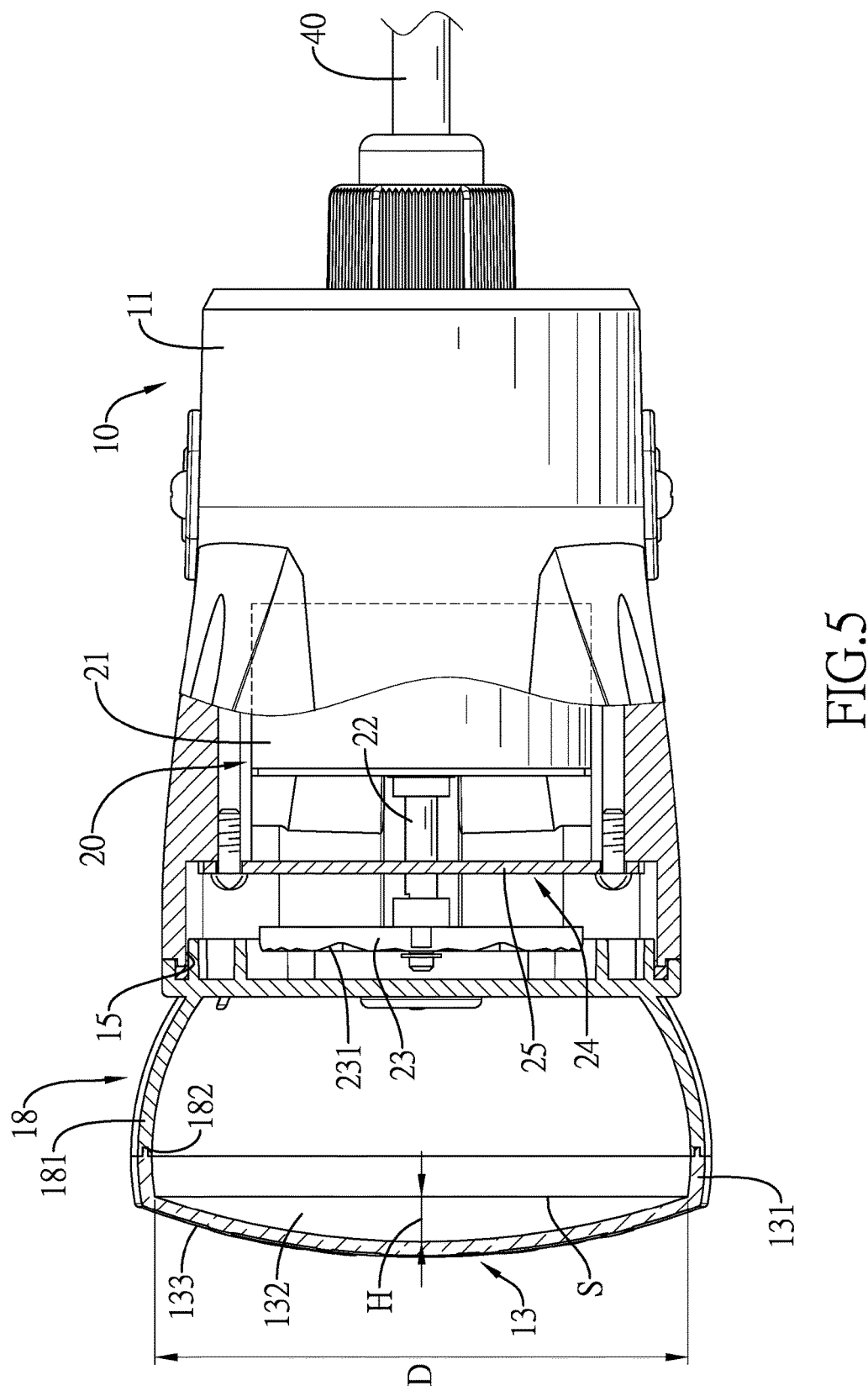
FIG. 5 is an enlarged top side view in partial section of the pattern projector in FIG. 1.

In use, with reference to FIGS. 2, 4, and 5, an electric wire 40 is inserted into the housing 10 via the wire hole 16 and is connected to the power box 12. The electric wire 40 is fixed in the wire clip 19 and transmits electricity to the power box 12 located in the chamber 14 of the base 11. The power box 12 can transfer alternating current (AC) to direct current (DC) and supplies direct current (DC) to the driver 21 and the at least one lighting member 24 of the projection device 20. The driver 21 is powered and drives the driving shaft 22 to rotate relative to driver 21. The inner lens 23 is rotated simultaneously. The corrugated stripes 231 of the inner lens 23 are rotated, too.

When the at least one lighting member 24 is powered, light is emitted by each one of the at least one lighting element 26 of the seat 25. The light passes through the inner lens 23 and is refracted to form a dynamic light. The dynamic light cannot pass through the opaque layer 133 and only passes through the outer lens 17 for projecting a pattern. The convex portion 132 protrudes out of the front surface of the connecting portion 131. The pattern projected cannot be distorted and overlapped. The contour of the pattern is clear in lighting variations. The entertaining effect of the pattern is increased and pattern remains clear.

In addition, the convex portion 132 protrudes out of the front surface of the connecting portion 131, and the pattern projected cannot be distorted and overlapped. Therefore, the outer lens 17 can clearly show and project a pattern including characters. A viewer can be comfortable in watching the characters projected and receives information showed by the characters projected.

With reference to FIG. 3, a bottom end of the grounding stick 32 is pointed and can be inserted into the ground directly. The pattern projector has the waterproof element 18 and the grounding stick 32 and can be used outdoors. Moreover, the cover 13 is detachably disposed in the base 11 for replacing another cover having a different outer lens to project a different pattern. Furthermore, the color of the light emitted by the at least one lighting element 26 can be changed for changing the color of the pattern projected. In addition, the driver 21 is detachably disposed in the base 11. The driver 21, the driving shaft 22, and the inner lens 23 can be detached from the base 11. The light emitted by the at least one lighting member 24 can directly pass through the outer lens 17 of the cover 13 for projecting a static pattern.

Accordingly, the pattern projected is made dynamic by the outer lens 17 of the cover 13 and the inner lens 23 rotated. The convex portion 132 protrudes out of the front surface of the connecting portion 131. The patterns projected by the pattern projector cannot be distorted and overlapped. The patterns are dynamic for increasing the entertaining effect. The contours of the patterns are clear in the projecting process for increasing the comfort of the viewer for watching the patterns. The cover 13 can be replaced for changing a new outer lens 17 to project a different pattern. Furthermore, the driver 21, the driving shaft 22, and the inner lens 23 can be detached from the base 11. The light emitted by the at least one lighting member 24 can directly pass through the outer lens 17 of the cover 13 for projecting a static pattern. The practicality and the versatility of the pattern projector are increased.

What is claimed is:
1. A pattern projector comprising:
   a housing having
      a base having
         a front surface;
         a chamber formed in the base; and
         an opening formed on the front surface of the base and communicating with the chamber of the base;
      a power box disposed in the base and located in the chamber of the base; and
      a cover disposed on the front surface of the base, covering the opening of the base, and having
         a connecting portion connected to the base and having a front surface;
         a convex portion forming on and protruding out of the front surface of the connecting portion, and having
            a rear surface facing the opening of the base; and
            an outer lens disposed on the convex portion; and
         a datum plane defined between the connecting portion and the convex portion;
      wherein a maximum height is defined from an inner surface of the convex portion to the datum plane, a maximum inner diameter of the convex portion is defined on the datum plane, and the maximum inner diameter is three times to eleven times as long as the maximum height; and
   a projection device disposed in the chamber of the base, and having
      at least one lighting member disposed in the base and electrically connected to the power box.
2. The pattern projector as claimed in claim 1, wherein the base has
   a rear surface; and
   a wire hole formed on the rear surface of the base and communicating with the chamber; and
the outer lens has
   multiple protrusions disposed on the convex portion for forming a pattern.

3. The pattern projector as claimed in claim 2, wherein the convex portion has a front surface;
   the outer lens is disposed on the front surface or the rear surface of the convex portion;
   the protrusions of the outer lens are dots, blocks, or strips; and
   the protrusions of the outer lens are formed on or mounted on the convex portion.
4. The pattern projector as claimed in claim 2, wherein the base has
   a waterproof element disposed on the front surface of the base, surrounding the opening of the base, and having
      a waterproof wall detachably disposed on the front surface of the base and having a front surface; and
      an engaging portion formed on the front surface of the waterproof wall and engaging with the connecting portion of the cover; and
   a wire clip disposed in the base, located in the chamber, and surrounding the wire hole; and
the cover has a front surface and an opaque layer disposed on the front surface of the cover and being adjacent to the outer lens.
5. The pattern projector as claimed in claim 3, wherein the base has
   a waterproof element disposed on the front surface of the base, surrounding the opening of the base, and having
      a waterproof wall detachably disposed on the front surface of the base and having a front surface; and
      an engaging portion formed on the front surface of the waterproof and engaging with the connecting portion of the cover; and
   a wire clip disposed in the base, located in the chamber, and surrounding the wire hole; and
the cover has a front surface and an opaque layer disposed on the front surface of the cover and being adjacent to the outer lens.
6. The pattern projector as claimed in claim 1, wherein the projection device has
   a driver detachably disposed in the housing, located in the chamber of the base, and electrically connected to the power box;
   a driving shaft rotatably disposed on the driver; and
   an inner lens disposed on the driving shaft and having multiple corrugated stripes formed on the inner lens; and
   wherein the at least one lighting member is located between the driver and the inner lens.
7. The pattern projector as claimed in claim 2, wherein the projection device has
   a driver detachably disposed in the housing, located in the chamber of the base, and electrically connected to the power box;
   a driving shaft rotatably disposed on the driver; and
   an inner lens disposed on the driving shaft and having multiple corrugated stripes formed on the inner lens; and
   wherein the at least one lighting member is located between the driver and the inner lens.
8. The pattern projector as claimed in claim 3, wherein the projection device has
   a driver detachably disposed in the housing, located in the chamber of the base, and electrically connected to the power box;
   a driving shaft rotatably disposed on the driver; and an inner lens disposed on the driving shaft and having multiple corrugated stripes formed on the inner lens; and wherein the at least one lighting member is located between the driver and the inner lens.

9. The pattern projector as claimed in claim 4, wherein the projection device has a driver detachably disposed in the housing, located in the chamber of the base, and electrically connected to the power box;

a driving shaft rotatably disposed on the driver; and an inner lens disposed on the driving shaft and having multiple corrugated stripes formed on the inner lens; and wherein the at least one lighting member is located between the driver and the inner lens.

10. The pattern projector as claimed in claim 5, wherein the projection device has a driver detachably disposed in the housing, located in the chamber of the base, and electrically connected to the power box;

a driving shaft rotatably disposed on the driver; and an inner lens disposed on the driving shaft and having multiple corrugated stripes formed on the inner lens; and wherein the at least one lighting member is located between the driver and the inner lens.

11. The pattern projector as claimed in claim 1, wherein the pattern projector has a supporting device, the supporting device is disposed below the base and has a frame and a grounding stick, the frame is rotatably disposed below the housing, and the grounding stick is rotatably disposed below the frame.

12. The pattern projector as claimed in claim 2, wherein the pattern projector has a supporting device, the supporting device is disposed below the base and has a frame and a grounding stick, the frame is rotatably disposed below the housing, and the grounding stick is rotatably disposed below the frame.

13. The pattern projector as claimed in claim 3, wherein the pattern projector has a supporting device, the supporting device is disposed below the base and has a frame and a grounding stick, the frame is rotatably disposed below the housing, and the grounding stick is rotatably disposed below the frame.

14. The pattern projector as claimed in claim 4, wherein the pattern projector has a supporting device, the supporting device is disposed below the base and has a frame and a grounding stick, the frame is rotatably disposed below the housing, and the grounding stick is rotatably disposed below the frame.

15. The pattern projector as claimed in claim 5, wherein the pattern projector has a supporting device, the supporting device is disposed below the base and has a frame and a grounding stick, the frame is rotatably disposed below the housing, and the grounding stick is rotatably disposed below the frame.

16. The pattern projector as claimed in claim 1, wherein one of the at least one lighting member has a seat and at least one lighting element, the seat is disposed in the base and has a side surface facing the cover, and the at least one lighting element is disposed on the side surface of the seat and is a light-emitting diode.

17. The pattern projector as claimed in claim 2, wherein one of the at least one lighting member has a seat and at least one lighting element, the seat is disposed in the base and has a side surface facing the cover, and the at least one lighting element is disposed on the side surface of the seat and is a light-emitting diode.

18. The pattern projector as claimed in claim 3, wherein one of the at least one lighting member has a seat and at least one lighting element, the seat is disposed in the base and has a side surface facing the cover, and the at least one lighting element is disposed on the side surface of the seat and is a light-emitting diode.

19. The pattern projector as claimed in claim 4, wherein one of the at least one lighting member has a seat and at least one lighting element, the seat is disposed in the base and has a side surface facing the cover, and the at least one lighting element is disposed on the side surface of the seat and is a light-emitting diode.

20. The pattern projector as claimed in claim 5, wherein one of the at least one lighting member has a seat and at least one lighting element, the seat is disposed in the base and has a side surface facing the cover, and the at least one lighting element is disposed on the side surface of the seat and is a light-emitting diode.

* * * * *